No. 890,275. PATENTED JUNE 9, 1908.
J. R. HALL.
CORN HUSKING AND FODDER SHREDDING MACHINE.
APPLICATION FILED APR. 4, 1907.
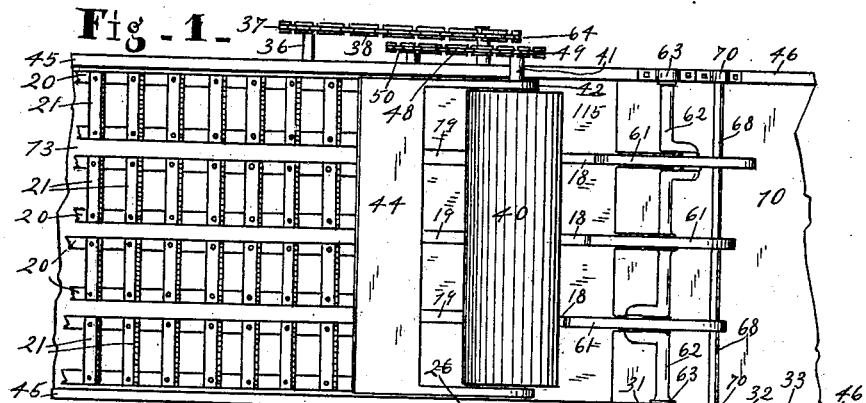
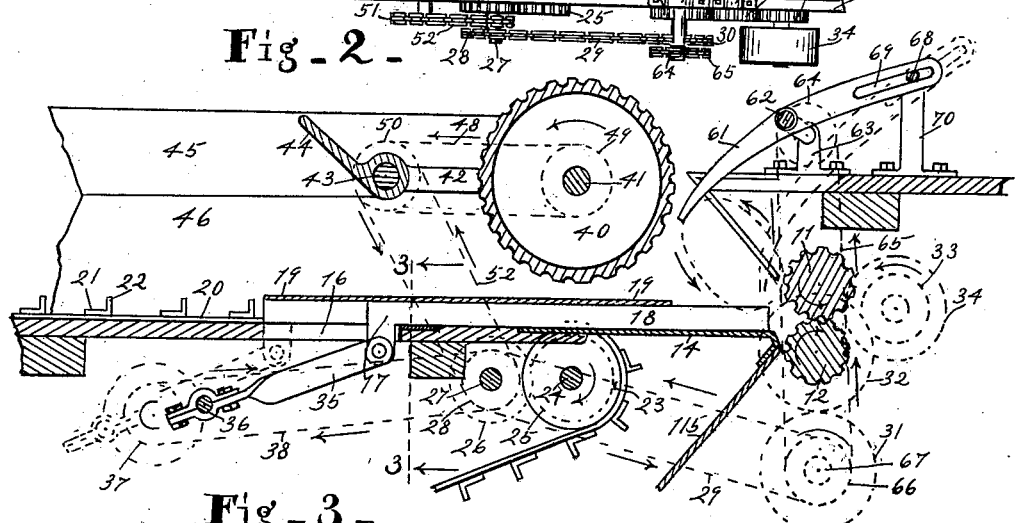
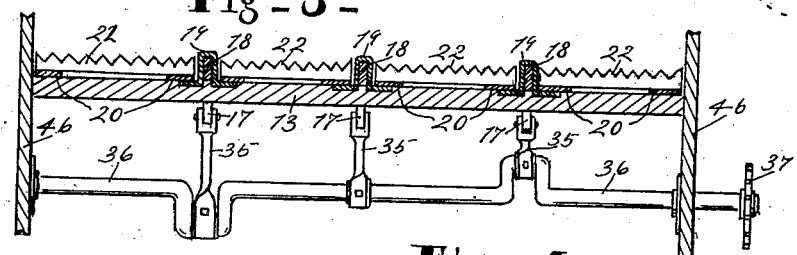
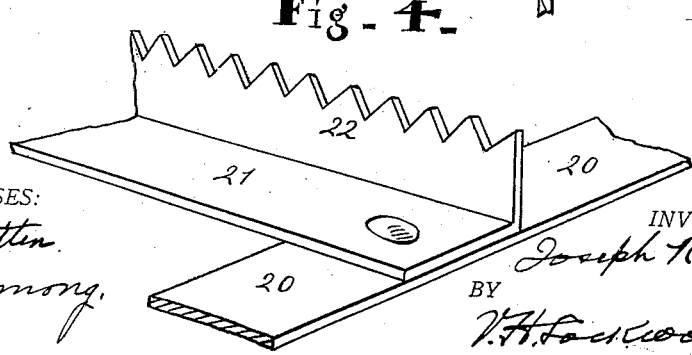
WITNESSES:
H. B. Patten
N. Allemong
INVENTOR.
Joseph R. Hall
BY
V. H. Lockwood
ATTORNEY.

UNITED STATES PATENT OFFICE.

JOSEPH R. HALL, OF INDIANAPOLIS, INDIANA.

CORN-HUSKING AND FODDER-SHREDDING MACHINE.

No. 890,275.  Specification of Letters Patent.  Patented June 9, 1908.

Application filed April 4, 1907. Serial No. 366,312.

*To all whom it may concern:*

Be it known that I, JOSEPH R. HALL, of Indianapolis, county of Marion, and State of Indiana, have invented a certain new and useful Corn-Husking and Fodder-Shredding Machine; and I do hereby declare that the following is a full, clear, and exact description thereof, reference being had to the accompanying drawings, in which like letters refer to like parts.

The object of this invention is to improve the construction of feed mechanisms for corn huskers, shredders and like machines.

One feature of invention herein consists in a series of fingers mounted over the snap rolls and behind the feed roll that beats down the fodder or other material towards the point between the two snap rolls and prevents the same from escaping upward between the feed roll and upper snap roll, as has been the difficulty with machines of this character heretofore.

Another feature of my invention consists in improving the construction of the endless conveyer so as to provide upwardly extending notched plates that will engage the fodder positively and feed it forward to the snap rolls.

Another feature of this invention consists in providing improvements in reciprocating bars for pushing the fodder stalks and the like positively and directly in between the two snap rolls. This and the other features of my invention will be fully understood from the claims of invention hereinafter set forth and the following description and the accompanying drawings.

Figure 1 is a plan view of the mechanism with the forward and rear parts broken away.
Fig. 2 is a central vertical section through what is shown in Fig. 1, with the parts broken away. Fig. 3 is a section on the line 3—3 of Fig. 2. Fig. 4 is a detail of a portion of the conveyer.

In detail the mechanism herein shown for the purpose of making plain what my invention is, but not for the purpose of limiting the invention to any particular details of construction, consists of a frame 10 of the machine in which there is mounted an upper snap roll 11, a lower snap roll 12 between which the stalks are forced for the purpose of removing the ears of corn and from them the stalks pass on to the shredding machinery.
The details of the shredding machinery are not shown. In front of the snap rolls there is a horizontal frame plate 13 with an extended metal plate 14 running up close to the lower snap roll and having a downwardly extending inclined flange 15 to which the plate 115 is bolted, as shown in Fig. 2. The plate 13 has longitudinal slots 16 in it through which the ears 17 of the push bars 18 project downwardly. These push bars reciprocate in guides 19 mounted upon the plate 13. There are three of these guides, see Figs. 1 and 3, and on each side of them and between them narrow endless plate conveyers 20 move, said conveyers consisting of a belt with transverse plates 21 riveted thereto with their forward edges turned upward at a right angle to form an upward extension 22 the upper edge of which is deeply notched, as seen in Figs. 3 and 4. These conveyers are actuated by the drums 23 mounted on the shaft 24 carrying the sprocket wheel 25 that meshes with the pinion 26 on the shaft 27. On the shaft 27 there is a sprocket wheel 28 and a chain 29 running to a pinion 30 on a shaft 17 suitably mounted on a frame and carrying a gear 31, that meshes with the gear 32 on the shaft of the snap roll 12 and that in turn with the gear 33 that is driven by a pulley 34 to which power is supplied from some suitable source.

The pushing bars 18 are actuated by a series of connecting rods 35 fulcrumed on a crank shaft 36, the cranks of said shaft being staggered with relation to each other so that the forward movement of the bars will be successive. The shaft 36 is driven by a sprocket wheel 37 secured to it and a chain 38 running to a sprocket wheel, on the shaft 27. The ends of the push rods 18 next to the snap rolls retreat to a point about flush with the ends of the guides 19 but in their forward movement they go to a point considerably beyond the end of the guides 19 and close to the snap rolls. The ends of the pushing bars 18 are rectangular so that they will engage the stalks and force the same in between the snap rolls. They ride upon the plates 13 and 14.

The feed roll 40 is mounted above the conveyers 20 and guides 19 and not far from the inner ends of said guides. Its surface is corrugated and it is mounted upon a shaft 41 carried in the rearward ends of arms 42 that are fulcrumed upon the shaft 43 which has secured to it the guard board 44 that extends transversely of the machine between the side boards 45 that are mounted upon the vertical side. The drum is driven by the sprocket chain 48 running from the sprocket wheel 49 on the shaft 41 to the sprocket wheel 50 on the shaft 43 and the shaft 43 is driven by the sprocket wheel 51 a chain 52 running from the pinion 53 on the shaft 27.

In front of the upper feed roll there is an upwardly inclined plate 60 secured to the forward end of frame 10. Said forward end of frame 10 and plate 60 are slotted so as to permit the operation of the fingers 61 that are fulcrumed on the crank shaft 62 having bearings in the stand 63 secured to the frame 10 and driven by the sprocket wheel 64 and a vertically extending sprocket chain 65 running from the sprocket 66 on the shaft 67.

The fingers 61 are guided in their movements by the rod 68 extending through the slots 69 in the rear ends of the fingers 61, said rod 68 being mounted in the stand 70 of the frame 10 of the machine. As the shaft 62 rotates the lower ends of the arms 61 are moved downwards towards the point between the two snap rolls and in that movement forces the fodder stalks etc. directly into the snap rolls and prevents the escape of the stalks forward in front of the feed roll 40. Then the lower end of the fingers 61 retreat behind plate 60 and disengage themselves from the stalks while they move upward. The path of movement of the lower point of the finger 61 is elliptical. The corn that is forced off the stalks by the snap rolls drops down between the narrow plates 14 upon the inclined plate 15.

What I claim as my invention and desire to secure by Letters Patent is:

1. In a corn-husking machine, a pair of snap rolls, means for feeding the stalks horizontally into the snap rolls, a plate projecting upwardly and forwardly from the upper snap roll with vertical slots therein, fingers mounted above the snap rolls and with their lower ends projecting through the slots in said plate, and means above the snap rolls for giving the ends of said fingers a parabolic movement for forcing the stalks in between the snap rolls, substantially as set forth.

2. In a corn husking machine, a pair of snap rolls, means for feeding the stalks horizontally thereto, a plate projecting upward and forward from the upper snap roll with vertical slots therein, a crank shaft mounted above the upper snap roll, and fingers mounted on said shaft that project and operate through the slots in said plate for forcing the stalks downward to the snap rolls.

3. In a corn husking machine, a pair of snap rolls, a crank shaft mounted above the snap rolls, fingers fulcrumed between their ends on the crank shaft with the end inclined forwardly and upwardly and longitudinally slots in the rear end of each finger, and a stationary rod extending through the slots in said fingers, whereby as the shaft rotates, the forward ends of the fingers will be moved downwardly towards the snap rolls.

4. In a corn husking machine, snap rolls, a platform horizontally disposed in front of the snap rolls, longitudinally extending guide-ways upon said platform, push bars reciprocable in said guide-ways, narrow plates extending from said platform to a point near the snap rolls upon which the advancing ends of said push bars operate, and conveyers between said guide-ways.

5. In a corn husking machine, snap rolls, a horizontally disposed platform in front of the snap rolls with longitudinal slots therein, guide-ways mounted on said platform over said slots, push bars mounted in said guide-ways with their rear ends rectangular, narrow plates extending from said platform under the rear ends of said push bars to a point near the snap rolls, endless conveyers between said guide-ways, a crank shaft under said platform, and connecting bars from said crank shaft to said push rods for actuating the same.

In witness whereof, I have hereunto affixed my signature in the presence of the witnesses herein named.

JOSEPH R. HALL.

Witnesses:
N. ALLEMONG,
OLIVE BREEDEN.